United States Patent
Inoue et al.

(10) Patent No.: US 10,605,358 B2
(45) Date of Patent: Mar. 31, 2020

(54) TRANSMISSION AND CONTROL METHOD FOR TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Mamiko Inoue, Isehara (JP); Hideshi Wakayama, Hadano (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 119 days.

(21) Appl. No.: 15/738,716

(22) PCT Filed: Jun. 13, 2016

(86) PCT No.: PCT/JP2016/067532
§ 371 (c)(1),
(2) Date: Dec. 21, 2017

(87) PCT Pub. No.: WO2016/208439
PCT Pub. Date: Dec. 29, 2016

(65) Prior Publication Data
US 2018/0180175 A1     Jun. 28, 2018

(30) Foreign Application Priority Data
Jun. 23, 2015   (JP) ................................ 2015-125534

(51) Int. Cl.
*F16H 61/04*     (2006.01)
*F16H 37/02*     (2006.01)
(Continued)

(52) U.S. Cl.
CPC ........... *F16H 61/04* (2013.01); *F16H 37/022* (2013.01); *F16H 61/66* (2013.01); *F16H 61/662* (2013.01);
(Continued)

(58) Field of Classification Search
CPC ............. F16H 61/04; F16H 2061/0482; F16H 37/022; F16H 61/66; F16H 61/662;
(Continued)

(56) References Cited

U.S. PATENT DOCUMENTS 7,493,203 B2 * 2/2009 Bitzer .................... F16H 37/084
                                                          477/107
8,241,178 B2 * 8/2012 Jozaki ............... F16H 61/66259
                                                         477/48

(Continued)

FOREIGN PATENT DOCUMENTS

JP         H05-79554 A     3/1993
WO     WO-2007/049685 A1     5/2007
WO     WO-2015/060051 A1     4/2015

*Primary Examiner* — Tinh Dang
(74) *Attorney, Agent, or Firm* — Foley & Lardner LLP

(57) ABSTRACT

A transmission includes a sub-transmission mechanism, a variator having lower shift responsiveness than the sub-transmission mechanism, and a controller configured to carry out a coordinated shift for changing a speed ratio of the variator in a direction opposite to a changing direction of a speed ratio of the sub-transmission mechanism as the sub-transmission mechanism is shifted so that a through speed ratio reaches a target through speed ratio. The controller sets a target speed ratio of the sub-transmission mechanism on the basis of the target through speed ratio and an actual speed ratio of the variator in carrying out the coordinated shift.

6 Claims, 5 Drawing Sheets

(51) Int. Cl.

| | |
|---|---|
| *F16H 61/66* | (2006.01) |
| *F16H 61/662* | (2006.01) |
| *F16H 61/70* | (2006.01) |
| *F16H 9/18* | (2006.01) |
| *F16H 59/14* | (2006.01) |
| *F16H 3/66* | (2006.01) |

(52) U.S. Cl.
CPC ..... *F16H 61/66259* (2013.01); *F16H 61/702* (2013.01); *F16H 3/66* (2013.01); *F16H 9/18* (2013.01); *F16H 2037/023* (2013.01); *F16H 2037/026* (2013.01); *F16H 2061/6614* (2013.01); *F16H 2200/0034* (2013.01); *F16H 2200/2038* (2013.01)

(58) Field of Classification Search
CPC .... F16H 61/66259; F16H 61/702; F16H 3/66; F16H 9/18; F16H 2037/023; F16H 2037/026; F16H 2061/6614; F16H 2200/0034; F16H 2200/2038; F16H 2059/144; F16H 2061/0496
See application file for complete search history.

(56) References Cited

U.S. PATENT DOCUMENTS

| | | | |
|---|---|---|---|
| 8,465,395 B2* | 6/2013 | Takahashi | F16H 37/022 477/115 |
| 8,560,189 B2* | 10/2013 | Tanaka | F16H 61/66259 701/55 |
| 8,666,616 B2* | 3/2014 | Tanaka | F16H 61/702 192/31 |
| 8,712,649 B2* | 4/2014 | Jozaki | F16H 61/66259 701/51 |
| 8,944,956 B2* | 2/2015 | Suzuki | F16H 61/0437 477/37 |
| 9,022,900 B2* | 5/2015 | Suzuki | F16H 61/16 477/41 |
| 2009/0229393 A1 | 9/2009 | Shibata et al. | |
| 2016/0223079 A1 | 8/2016 | Takahashi et al. | |

* cited by examiner

TRANSMISSION AND CONTROL METHOD FOR TRANSMISSION

TECHNICAL FIELD

The present invention relates to a transmission and a control method for transmission.

BACKGROUND ART

In a transmission, a stepped transmission mechanism is provided in series with a continuously variable transmission mechanism and a coordinated shift may be carried out to change a speed ratio of the continuously variable transmission mechanism in a direction opposite to a changing direction of a speed ratio of the stepped transmission mechanism as the stepped transmission mechanism is shifted. Such a technique is disclosed, for example, in JP5-79554A.

SUMMARY OF INVENTION

Shift responsiveness of a transmission mechanism differs, for example, depending on a structure and the like. If a shift delay occurs in the transmission mechanism having lower shift responsiveness during a coordinated shift, the coordinated shift is lost and an unintended vehicle speed variation or the like is induced. Thus, a sense of incongruity may be given to a driver.

The present invention was developed in view of such a technical problem and aims to provide a transmission and a control method for transmission capable of eliminating a sense of incongruity given to a driver as a result of a lost coordinated shift even if a first transmission mechanism and a second transmission mechanism differ in shift responsiveness.

A transmission according to a certain aspect of the present invention includes a first transmission mechanism provided in a power transmission path for transmitting power from a drive source of a vehicle to drive wheels, a second transmission mechanism provided in series with the first transmission mechanism in the power transmission path, the second transmission mechanism having lower shift responsiveness than the first transmission mechanism, and a shift control unit configured to carry out a coordinated shift for changing a speed ratio of the second transmission mechanism in a direction opposite to a changing direction of a speed ratio of the first transmission mechanism as the first transmission mechanism is shifted so that a through speed ratio, the through speed ratio being an overall speed ratio of the first and second transmission mechanisms, reaches a target through speed ratio. The shift control unit sets a target speed ratio of the first transmission mechanism on the basis of the target through speed ratio and an actual speed ratio of the second transmission mechanism in carrying out the coordinated shift.

According to another aspect of the present invention, a control method for a transmission with a first transmission mechanism provided in a power transmission path for transmitting power from a drive source of a vehicle to drive wheels, and a second transmission mechanism provided in series with the first transmission mechanism in the power transmission path, the second transmission mechanism having lower shift responsiveness than the first transmission mechanism is provided. The control method for the transmission includes carrying out a coordinated shift for changing a speed ratio of the second transmission mechanism in a direction opposite to a changing direction of a speed ratio of the first transmission mechanism as the first transmission mechanism is shifted so that a through speed ratio, the through speed ratio being an overall speed ratio of the first and second transmission mechanisms, reaches a target through speed ratio, and setting a target speed ratio of the first transmission mechanism on the basis of the target through speed ratio and an actual speed ratio of the second transmission mechanism in carrying out the coordinated shift.

According to these aspects, a target sub-speed ratio of the first transmission mechanism having higher shift responsiveness than the second transmission mechanism is set on the basis of the target through speed ratio and the actual speed ratio of the second transmission mechanism in carrying out a coordinated shift. Thus, a deviation between the target through speed ratio and an actual through speed ratio can be prevented. Thus, even if the first and second transmission mechanisms differ in shift responsiveness, a loss of the coordinated shift can be suppressed, with the result that a sense of incongruity given to a driver can be eliminated.

DESCRIPTION OF EMBODIMENT

Hereinafter, an embodiment of the present invention is described with reference to the accompanying drawings.

Figure 1:
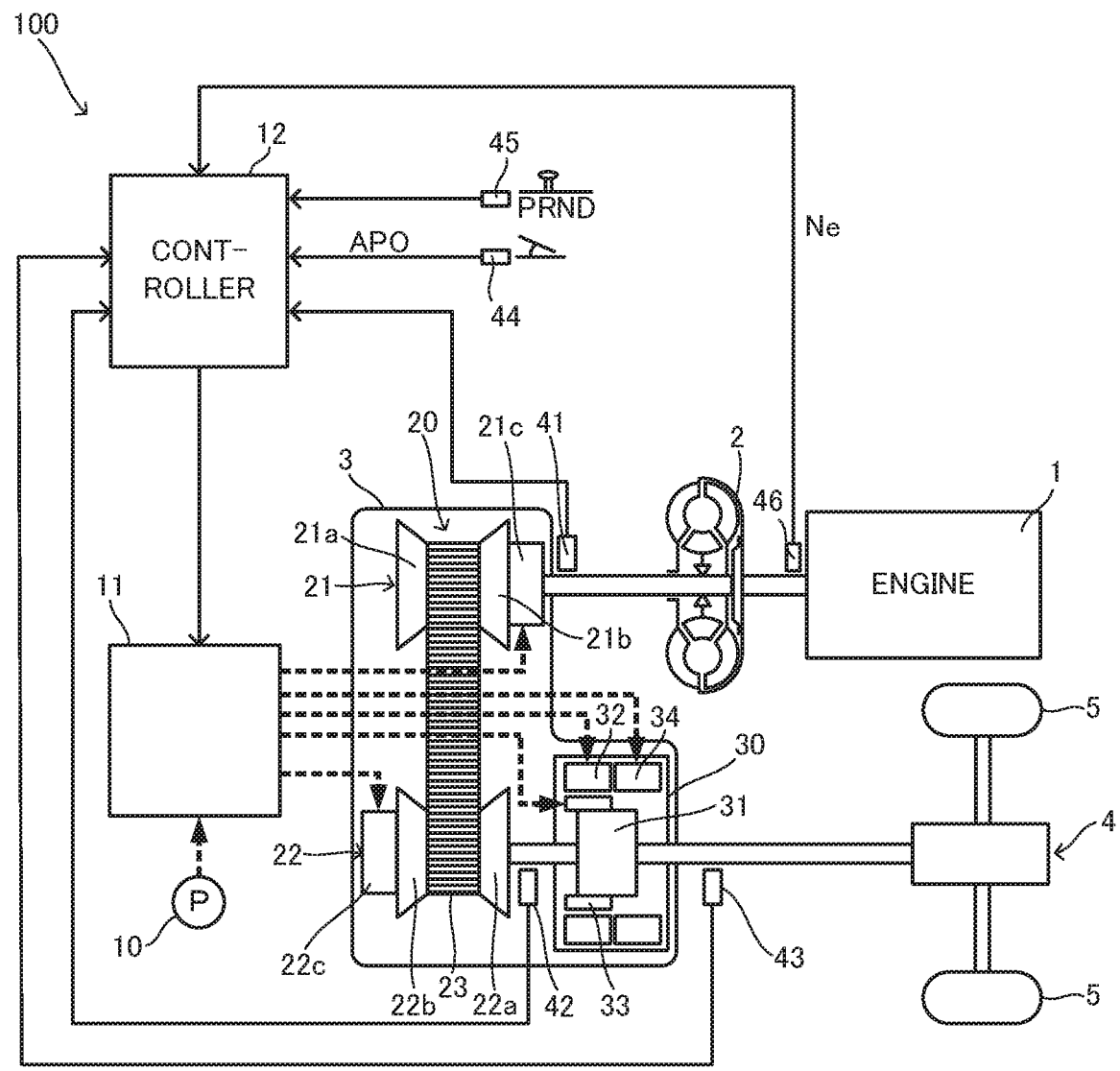
FIG. 1 is a diagram showing an essential part of a vehicle including a transmission.

FIG. 1 is a diagram showing an essential part of a vehicle including a transmission 100. The vehicle includes an engine 1, a torque converter 2, a variator 20, a sub-transmission mechanism 30, a vehicle axle part 4 and drive wheels 5.

The engine 1 constitutes a drive source of the vehicle. The torque converter 2 transmits power via fluid. The variator 20 and the sub-transmission mechanism 30 convert an input rotation speed and output a rotation speed corresponding to a speed ratio. The vehicle axle part 4 is configured to include a reduction gear, a differential device and a drive axle. Power of the engine 1 is transmitted to the drive wheels 5 via the torque converter 2, the variator 20, the sub-transmission mechanism 30 and the vehicle axle part 4.

The variator 20 is a continuously variable transmission mechanism and includes a primary pulley 21, a secondary pulley 22 and a belt 23. Primary is referred to as PRI and secondary is referred to as SEC below.

The PRI pulley 21 includes a fixed pulley 21a, a movable pulley 21b and a PRI chamber 21c. In the PRI pulley 21, a PRI pressure is supplied to the PRI chamber 21c.

The SEC pulley 22 includes a fixed pulley 22a, a movable pulley 22b and a SEC chamber 22c. In the SEC pulley 22, a SEC pressure is supplied to the SEC chamber 22c.

The belt 23 is wound on a V-shaped sheave surface formed by the fixed pulley 21a and the movable pulley 21b of the PRI pulley 21 and a V-shaped sheave surface formed by the fixed pulley 22a and the movable pulley 22b of the SEC pulley 22.

The variator 20 constitutes a belt continuously variable transmission mechanism for shifting by changing each of groove widths of the PRI pulley 21 and the SEC pulley 22 to change a winding diameter of the belt 23.

In such a variator 20, the movable pulley 21b operates to change the groove width of the PRI pulley 21 by controlling the PRI pressure. Further, the movable pulley 22b operates to change the groove width of the SEC pulley 22 by controlling the SEC pressure.

The PRI pressure and the SEC pressure are generated in a hydraulic control circuit 11 using a line pressure PL as a source pressure. The line pressure PL may be applied as one of the PRI pressure and the SEC pressure. In this case, the variator 20 can be configured as a variator of a single pressure adjusting type.

The sub-transmission mechanism 30 is a stepped transmission mechanism and has two forward and one reverse gear positions. The sub-transmission mechanism 30 has a first speed and a second speed having a smaller speed ratio than the first speed as the forward gear positions. The sub-transmission mechanism 30 is provided in series on an output side of the variator 20 in a power transmission path from the engine 1 to the drive wheels 5. The sub-transmission mechanism 30 may be directly connected to the variator 20 or may be indirectly connected to the variator 20 via another configuration such as a gear train.

The sub-transmission mechanism 30 is provided with a planetary gear mechanism 31 and a plurality of friction engaging elements including a low brake 32, a high clutch 33 and a reverse brake 34. The gear position of the sub-transmission mechanism 30 is changed by adjusting hydraulic pressures supplied to the plurality of friction engaging elements and changing engaged/disengaged states of the plurality of friction engaging elements.

For example, if the low brake 32 is engaged and the high clutch 33 and the reverse brake 34 are disengaged, the gear position is set to the first speed. Further, if the high clutch 33 is engaged and the low brake 32 and the reverse brake 34 are disengaged, the gear position is set to the second speed. Further, if the reverse brake 34 is engaged and the low brake 32 and the high clutch 33 are disengaged, the gear position is set to a reverse speed.

In the vehicle, the speed ratio is changed in each of the variator 20 and the sub-transmission mechanism 30. Thus, in the vehicle, a shift is carried out according to a through speed ratio which is an overall speed ratio of the variator 20 and the sub-transmission mechanism 30. The through speed ratio is a speed ratio obtained by multiplying the speed ratio of the variator 20 by the speed ratio of the sub-transmission mechanism 30.

In the variator 20 and the sub-transmission mechanism 30, the variator 20 has slower shift responsiveness than the sub-transmission mechanism 30. Slow shift responsiveness means a large delay in responsiveness of an actual speed ratio to a shift command.

Thus, even if a shift command is simultaneously output to the variator 20 and the sub-transmission mechanism 30, the actual speed ratio changes at a later timing in the variator 20 than in the sub-transmission mechanism 30. Further, even if a similar shift command is output to the variator 20 and the sub-transmission mechanism 30, a changing rate of the actual speed ratio is lower in the variator 20 than in the sub-transmission mechanism 30.

The variator 20 constitutes an automatic transmission mechanism 3 together with the sub-transmission mechanism 30. The variator 20 and the sub-transmission mechanism 30 may be configured as structurally individual transmission mechanisms.

The vehicle further includes an oil pump 10, the hydraulic control circuit 11 and a controller 12.

The oil pump 10 feeds oil under pressure. A mechanical oil pump configured to be driven by the power of the engine 1 can be used as the oil pump 10.

The hydraulic control circuit 11 adjusts a pressure of the oil fed under pressure from the oil pump 10, i.e. a hydraulic pressure and transmits the adjusted hydraulic pressure to each component of the variator 20 and the sub-transmission mechanism 30. In the hydraulic control circuit 11, for example, the line pressure LP, the PRI pressure and the SEC pressure are adjusted.

The controller 12 is an electronic control device and controls the hydraulic control circuit 11. Output signals of rotation sensors 41, 42 and 43 are input to the controller 12.

The rotation sensor 41 is a variator input-side rotation sensor for detecting a rotation speed on an input side of the variator 20. The rotation sensor 42 is a variator output-side rotation sensor for detecting a rotation speed on an output side of the variator 20. The rotation sensor 42 specifically detects the rotation speed on the output side of the variator 20 and on an input side of the sub-transmission mechanism 30. The rotation sensor 43 is a sub-transmission mechanism output-side rotation sensor for detecting a rotation speed on an output side of the sub-transmission mechanism 30.

The rotation speed on the input side of the variator 20 is specifically a rotation speed of an input shaft of the variator 20. The rotation speed on the input side of the variator 20 may be a rotation speed at a position, for example, at a side opposite to the variator 20 across a gear train in the aforementioned power transmission path. The same applies also for the rotation speed on the output side of the variator 20 and the rotation speed on the output side of the sub-transmission mechanism 30.

Besides these, output signals of an accelerator pedal opening sensor 44, an inhibitor switch 45, an engine rotation sensor 46 and the like are input to the controller 12.

The accelerator pedal opening sensor 44 detects an accelerator pedal opening APO representing an operated amount of an accelerator pedal. The inhibitor switch 45 detects the position of a select lever. The engine rotation sensor 46 detects a rotation speed Ne of the engine 1. The controller 12 can detect a vehicle speed VSP on the basis of the output signal of the rotation sensor 43.

The controller 12 generates a shift control signal on the basis of these signals and outputs the generated shift control signal to the hydraulic control circuit 11. The hydraulic control circuit 11 controls the line pressure PL, the PRI pressure and the SEC pressure and switches hydraulic pressure paths on the basis of the shift control signal from the controller 12.

In this way, the hydraulic pressure corresponding to the shift control signal is transmitted from the hydraulic control circuit 11 to each component of the variator 20 and the sub-transmission mechanism 30. As a result, the speed ratios of the variator 20 and the sub-transmission mechanism 30 are changed to speed ratios corresponding to the shift control signal, i.e. target speed ratios.

The transmission 100 is an automatic transmission and configured to include the hydraulic control circuit 11 and the controller 12 for controlling the speed ratios in this way, and the rotation sensors 41, 42 and 43 besides the variator 20 and the sub-transmission mechanism 30. The transmission 100 may be configured to further include, for example, pressure sensors for detecting hydraulic pressures supplied to the plurality of friction engaging elements of the sub-transmission mechanism 30 and the like.

Figure 2:
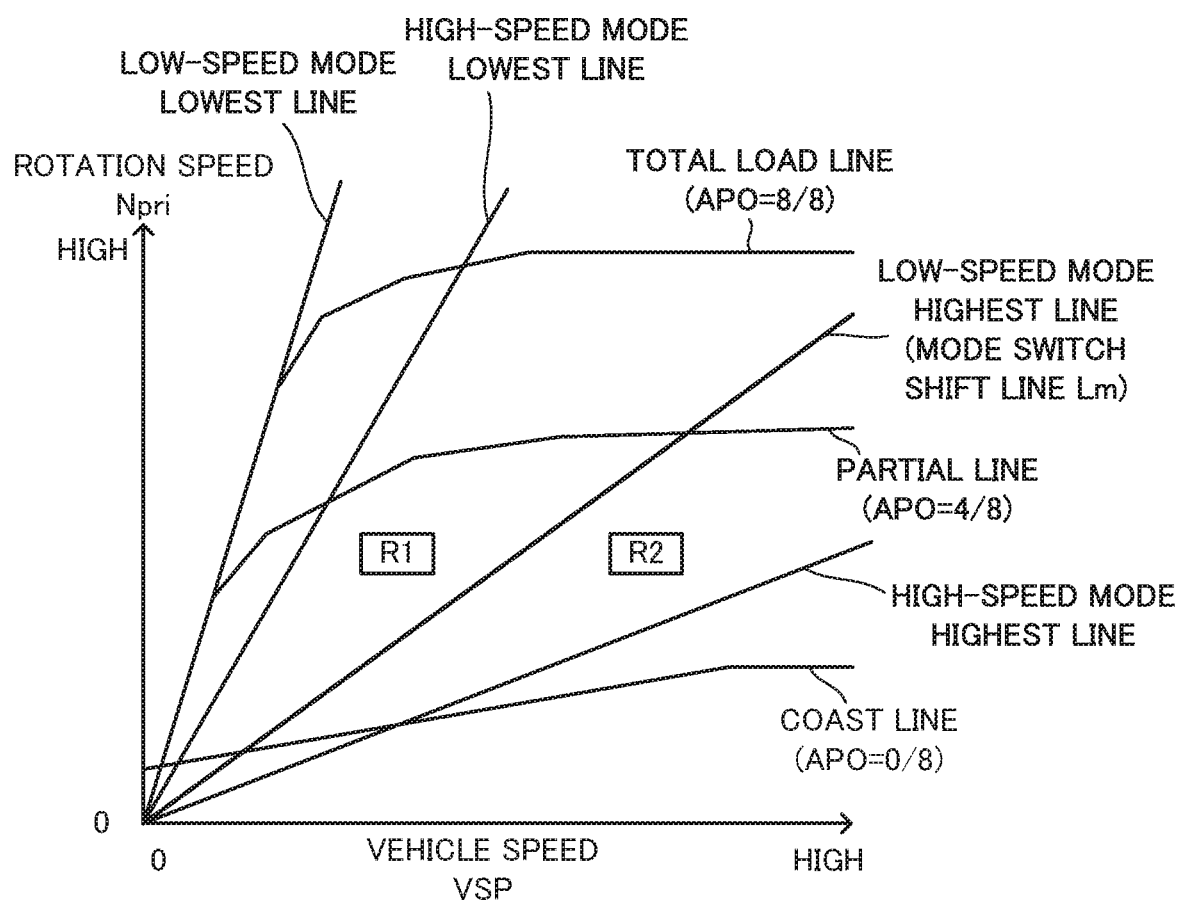
FIG. 2 is a graph showing an example of a shift map.

FIG. 2 is a graph showing an example of a shift map. In FIG. 2, a total load line which is a shift line when the accelerator pedal opening APO=8/8, a partial line which is a shift line when the accelerator pedal opening APO=4/8 and a coast line which is a shift line when the accelerator pedal opening APO=0 are illustrated as shift lines.

The transmission 100 is shifted on the basis of the shift map. In the shift map, an operating point of the transmission 100 is shown according to the vehicle speed VSP and a rotation speed Npri. The rotation speed Npri is a rotation speed of the PRI pulley 21.

The transmission 100 is shifted in accordance with the shift line selected according to the accelerator pedal opening APO. Thus, the shift line is set for each accelerator pedal opening APO in the shift map. In the shift map, the speed ratio of the transmission 100, i.e. the through speed ratio, is represented by a gradient of a line connecting the operating point of the transmission 100 and a zero point of the shift map.

When the gear position of the sub-transmission mechanism 30 is the first speed, the transmission 100 can be shifted between a low-speed mode lowest line obtained by maximizing the speed ratio of the variator 20 and a low-speed mode highest line obtained by minimizing the speed ratio of the variator 20.

When the gear position of the sub-transmission mechanism 30 is the second speed, the transmission 100 can be shifted between a high-speed mode lowest line obtained by maximizing the speed ratio of the variator 20 and a high-speed mode highest line obtained by minimizing the speed ratio of the variator 20.

A mode switch shift line Lm used to shift the sub-transmission mechanism 30 is further set in the shift map. In this example, the mode switch shift line Lm is set at the low-speed mode highest line. A region R1 represents a region having a lower vehicle speed VSP than the mode switch shift line Lm and a region R2 represents a region having a higher vehicle speed VSP than the mode switch shift line Lm.

The controller 12 starts shifting the sub-transmission mechanism 30 when the operating point of the transmission 100 crosses the mode switch shift line Lm. Further, as the sub-transmission mechanism 30 is shifted, the controller 12 carries out a coordinated shift for changing the speed ratio of the variator 20 in a direction opposite to a changing direction of the speed ratio of the sub-transmission mechanism 30 so that the through speed ratio reaches a target through speed ratio.

Specifically, the controller 12 starts a 1-2 shift for upshifting the gear position of the sub-transmission mechanism 30 from the first speed to the second speed when the operating point of the transmission 100 crosses the mode switch shift line Lm from the region R1 toward the region R2. Further, in this case, the controller 12 specifically carries out a coordinated shift for changing the speed ratio of the variator 20 in a direction to increase the speed ratio, i.e. toward a Low side. The coordinated shift may include a shift of the sub-transmission mechanism 30.

A 2-1 shift for downshifting the gear position of the sub-transmission mechanism 30 from the second speed to the first speed is, for example, carried out according to an accelerator pedal operation or a select lever operation of a driver. In the case of carrying out the 2-1 shift, a shift for changing the speed ratio in a direction to decrease the speed ratio, i.e. toward a High side can be carried out in the variator 20. Such a shift may be carried out as a coordinated shift for changing the speed ratio of the variator 20 such that the through speed ratio reaches the target through speed ratio.

Figure 3:
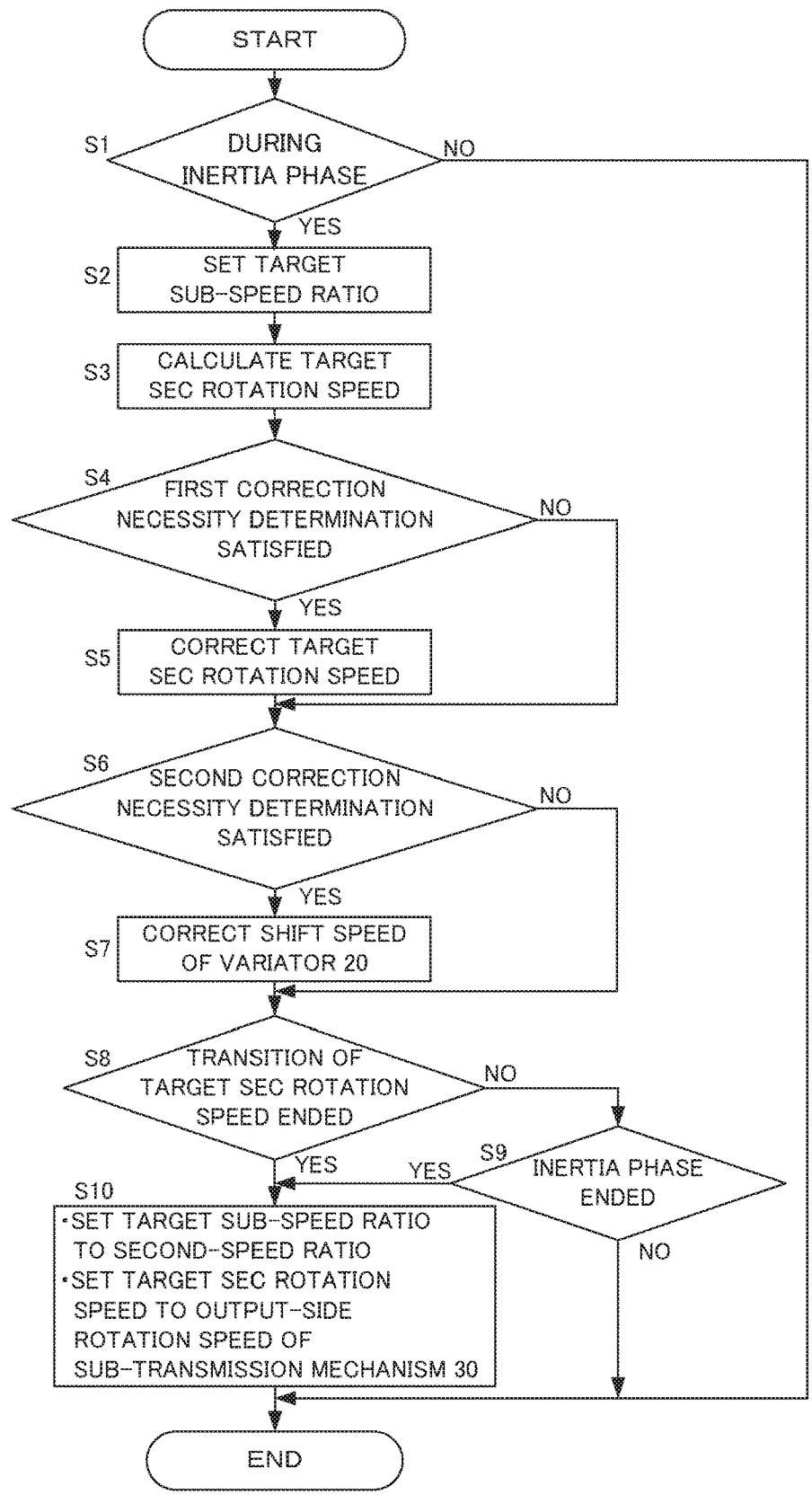
FIG. 3 is a flow chart showing an example of a control executed in an embodiment.

Next, an example of a control executed by the controller 12 is described using a flow chart shown in FIG. 3. The controller 12 can repeatedly perform a process shown in this flow chart at every infinitesimal time interval. A process after the start of the 1-2 shift is described in FIG. 3.

In Step S1, the controller 12 determines whether or not the sub-transmission mechanism 30 is in an inertia phase including the start of the inertia phase of the sub-transmission mechanism 30. The inertia phase is a shift stage in which the speed ratio of the sub-transmission mechanism 30 actually changes, and a coordinated shift is carried out in the inertia phase.

Such determination can be made, for example, by determining whether or not a target value of the hydraulic pressure supplied to the high clutch 33, which is the friction engaging element to be engaged during a shift, is larger than a predetermined value. The predetermined value is a value for determining the re-engagement of the friction engaging elements in the sub-transmission mechanism 30 and can be set in advance through an experiment or the like. In the case of carrying out the 1-2 shift, the engaged friction engaging element is switched from the low brake 32 to the high clutch 33 in the sub-transmission mechanism 30.

If the determination in Step S1 is negative, the controller 12 temporarily ends the process of this flow chart. If the determination in Step S1 is affirmative, the process proceeds to Step S2.

In Step S2, the controller 12 sets a target sub-speed ratio, which is a target speed ratio of the sub-transmission mechanism 30, on the basis of a target through speed ratio and an actual speed ratio of the variator 20.

The target through speed ratio is, for example, set such that the through speed ratio is constant even if the sub-transmission mechanism 30 is shifted. Thus, a mode switch speed ratio, which is a speed ratio corresponding to the mode switch shift line Lm, can be applied as the target through speed ratio. The actual speed ratio of the variator 20 can be calculated on the basis of outputs of the rotation sensors 41 and 42.

The processing of Step S2 is performed in carrying out a coordinated shift by being performed in response to the start of the inertia phase, and is performed during the inertia phase, specifically only during the inertia phase.

In Step S3, the controller 12 calculates a target SEC rotation speed. The target SEC rotation speed is a target value of a SEC rotation speed, and the SEC rotation speed is a rotation speed of the SEC pulley 22. The target SEC rotation speed is calculated by multiplying the target sub-speed ratio by an output-side rotation speed of the sub-transmission mechanism 30.

The target SEC rotation speed is calculated in Step S3 because the target SEC rotation speed can be treated as a parameter equivalent to the target sub-speed ratio by assuming that the output-side rotation speed of the sub-transmission mechanism 30 is constant during the 1-2 shift.

In Step S4, the controller 12 determines whether or not a first correction necessity determination is satisfied. In the first correction necessity determination, whether or not the target speed ratio and the actual speed ratio in the variator 20 at the start of the inertia phase differ is determined, and the determination is satisfied if these differ.

If the determination in Step S4 is affirmative, the process proceeds to Step S5. In this case, the controller 12 corrects the target SEC rotation speed. The correction of the target SEC rotation speed is described later. After Step S5 or negative determination in Step S4, the process proceeds to Step S6.

In Step S6, the controller 12 determines whether or not a second correction necessity determination is satisfied. In the second correction necessity determination, whether or not the target through speed ratio and the through speed ratio deviate is determined, and the determination is satisfied if these deviate.

Whether or not the target through speed ratio and the through speed ratio deviate is specifically determined by determining whether or not a shift speed of the sub-transmission mechanism 30 has reached a lower limit value. The lower limit value is described later.

If the determination in Step S6 is affirmative, the process proceeds to Step S7 and the controller 12 corrects a shift speed of the variator 20. The correction of the shift speed of the variator 20 is described later. After Step S7 or negative determination in Step S6, the process proceeds to Step S8.

In Step S8, the controller 12 determines whether or not a transition of the target SEC rotation speed has been ended. Here, since a second-speed speed ratio is "1" in the sub-transmission mechanism 30, the target SEC rotation speed transitions to the output-side rotation speed of the sub-transmission mechanism 30 in the 1-2 shift.

Thus, in Step S8, the controller 12 specifically determines whether or not the target SEC rotation speed is equal to or lower than the output-side rotation speed of the sub-transmission mechanism 30. If the determination in Step S8 is negative, the process proceeds to Step S9.

In Step S9, the controller 12 determines whether or not the inertia phase has been ended. In the 1-2 shift, the inertia phase is ended when the sub-speed ratio, which is the speed ratio of the sub-transmission mechanism 30, reaches the second-speed speed ratio, thus when an actual SEC rotation speed has reached the output-side rotation speed of the sub-transmission mechanism 30.

Thus, in Step S9, the controller 12 specifically determines whether or not the actual SEC rotation speed is equal to or lower than the output-side rotation speed of the sub-transmission mechanism 30. If the determination in Step S9 is negative, the sub-transmission mechanism 30 is still in the inertia phase. Thus, the controller 12 temporarily ends the process of this flow chart.

In the case of affirmative determination in Step S8 or Step S9, a state where the target sub-speed ratio may be fixed at the second-speed speed ratio and the target SEC rotation speed may be fixed at the output-side rotation speed of the sub-transmission mechanism 30 can be judged.

Thus, in this case, the process proceeds to Step S10 and the controller 12 sets the target sub-speed ratio to the second-speed speed ratio and sets the target SEC rotation speed to the output-side rotation speed of the sub-transmission mechanism 30. After Step S10, the controller 12 temporarily ends the process of this flow chart.

Next, the target SEC rotation speed correction performed in Step S5 described above is described using FIGS. 4A and 4B.

Figure 4A:
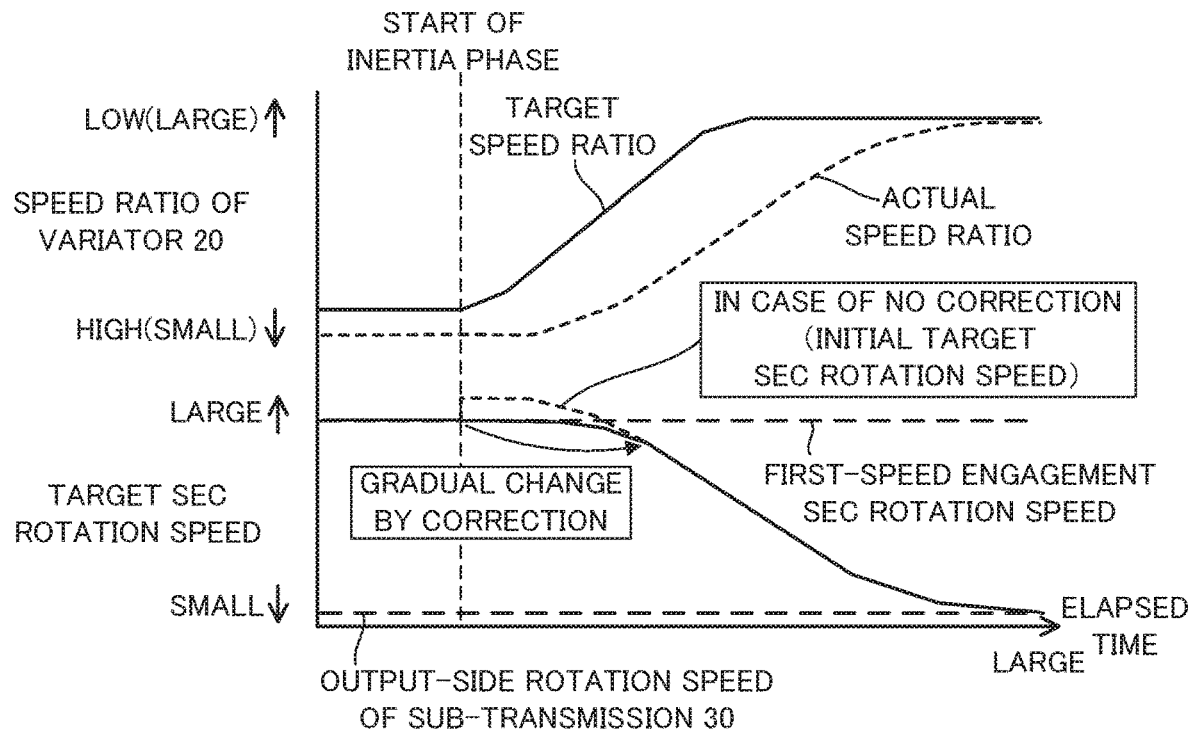
FIG. 4A is a first chart showing a target SEC rotation speed correction.
Figure 4B:
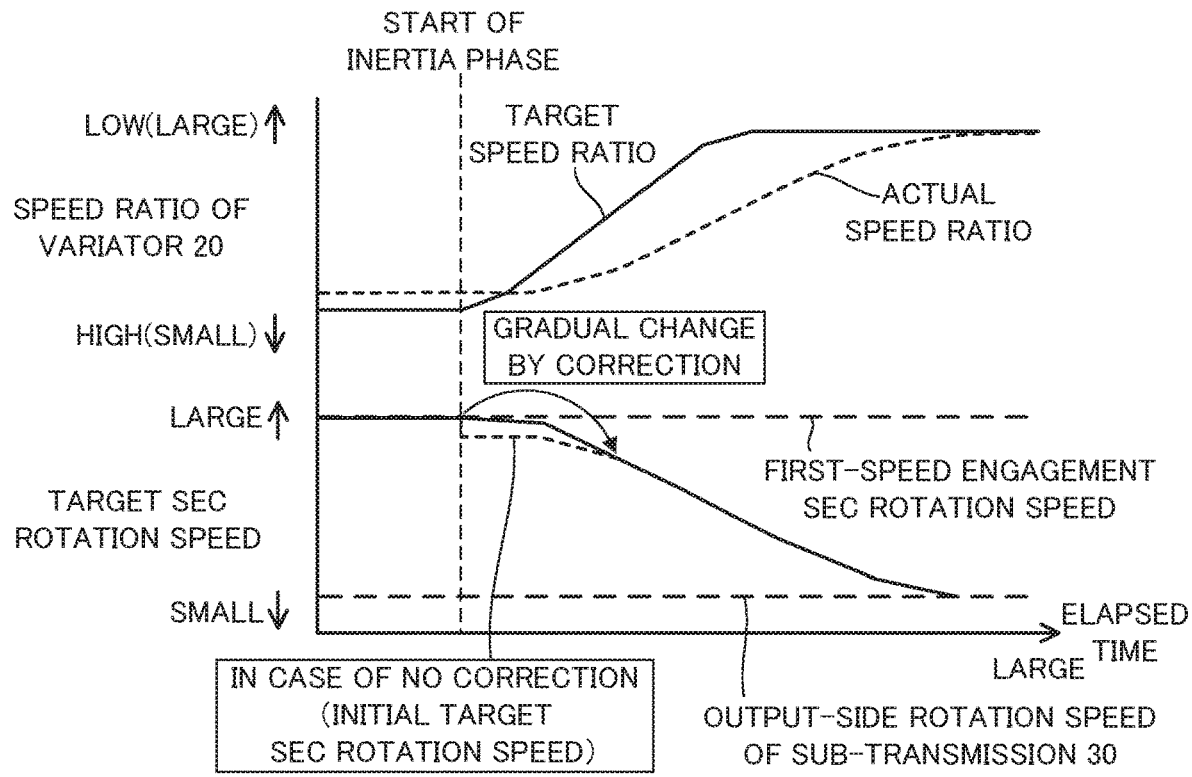
FIG. 4B is a second chart showing the target SEC rotation speed correction.

FIG. 4A is a first chart showing the target SEC rotation speed correction. FIG. 4B is a second chart showing the target SEC rotation speed correction. FIG. 4A shows a case where the actual speed ratio is lower than the target speed ratio in the variator 20 at the start of the inertia phase. FIG. 4B shows a case where the actual speed ratio is higher than the target speed ratio in the variator 20 at the start of the inertia phase.

In the case of FIG. 4A, unless the correction is performed, the target SEC rotation speed is calculated to be higher than a first-speed engagement SEC rotation speed since the actual speed ratio is lower than the target speed ratio in the variator 20 at the start of the inertia phase. The first-speed engagement SEC rotation speed is a SEC rotation speed obtained in the gear position engaged in the sub-transmission mechanism 30 before the start of the inertia phase after the shift of the sub-transmission mechanism 30 is started. As a result, the target SEC rotation speed suddenly changes at the start of the inertia phase.

In the case of FIG. 4B, unless the correction is performed, the target SEC rotation speed is calculated to be lower than the first-speed engagement SEC rotation speed since the actual speed ratio is higher than the target speed ratio in the variator at 20 the start of the inertia phase. As a result, also in this case, the target SEC rotation speed suddenly changes at the start of the inertia phase.

Thus, the controller 12 performs a correction to transition from the first-speed engagement SEC rotation speed at the start of the inertia phase to an initial target SEC rotation speed by changing the target SEC rotation speed by a predetermined change amount when the target speed ratio and the actual speed ratio differ in the variator 20 at the start of the inertia phase.

The initial target SEC rotation speed is a target SEC rotation speed when such a correction is not performed; hence the target SEC rotation speed calculated by the controller 12 in Step S3 described above.

Such a correction can be performed, for example, by setting the target SEC rotation speed to the first-speed engagement SEC rotation speed at the start of the inertia phase and gradually reducing the target SEC rotation speed by the predetermined change amount according to a difference between the initial target SEC rotation speed and the first-speed engagement rotation speed until the target SEC rotation speed reaches the initial target SEC rotation speed.

In the case of FIG. 4A, the predetermined change amount can be set to increase as a difference obtained by subtracting the first-speed engagement SEC rotation speed from the initial target speed ratio decreases, including a case where a sign becomes negative.

In the case of FIG. 4B, the predetermined change amount can be set to increase as a difference obtained by subtracting the initial target SEC rotation speed from the first-speed engagement SEC rotation speed increases.

A case where the target speed ratio and the actual speed ratio differ in the variator 20 at the start of the inertia phase may be a case where the magnitude of a difference between the first-speed engagement rotation speed and the initial target SEC rotation speed is larger than a predetermined value at the start of the inertia phase. The predetermined value is a value for considering an error, individual differences, a margin and the like and can be set in advance through an experiment or the like.

As described above, the target SEC rotation speed can be treated as a parameter equivalent to the target sub-speed ratio. Thus, the controller 12 performs a correction to transition from the first-speed speed ratio to an initial target sub-speed ratio by changing the target sub-speed ratio by a predetermined change amount when the target speed ratio and the actual speed ratio differ in the variator 20 at the start of the inertia phase.

Here, the first-speed speed ratio is a speed ratio obtained in the gear position engaged in the sub-transmission mechanism 30 before the start of the inertia phase after the shift of the sub-transmission mechanism 30 is started. Further, the initial target sub-speed ratio is a target sub-speed ratio when such a correction is not performed; hence the target sub-speed ratio set by the controller 12 in Step S2 described above.

Next, the correction of the shift speed of the variator 20 performed in Step S7 described above is described using FIG. 5.

At timing T1, the shift speed of the sub-transmission mechanism 30 reaches the lower limit value and the second correction necessity determination is satisfied. The shift speed of the sub-transmission mechanism 30 is, in other words, the magnitude of a target SEC rotation speed change rate, i.e. the magnitude of a gradient of the target SEC rotation speed.

The lower limit value is specifically set as a minimum value of the shift speed at which judder does not occur in shifting the sub-transmission mechanism 30. The judder is a phenomenon in which a force does not smoothly act on a friction surface to cause abnormal noise or vibration in a friction clutch or friction brake for transmitting power by friction.

The lower limit value is set as described above for the following reason. Specifically, in the coordinated shift, if the shift speed of the variator 20 is low, the shift speed of the sub-transmission mechanism 30 is also restricted to be low. Further, in the sub-transmission mechanism 30, judder possibly occurs in the friction engaging elements if the shift speed decreases.

On the other hand, if the shift speed of the sub-transmission mechanism 30 reaches the lower limit value, it is no longer possible to further reduce the shift speed of the sub-transmission mechanism 30 by the coordinated shift. Thus, there is a possibility of losing the coordinated shift. As a result, the target through speed ratio and the through speed ratio possibly deviate.

Figure 5:
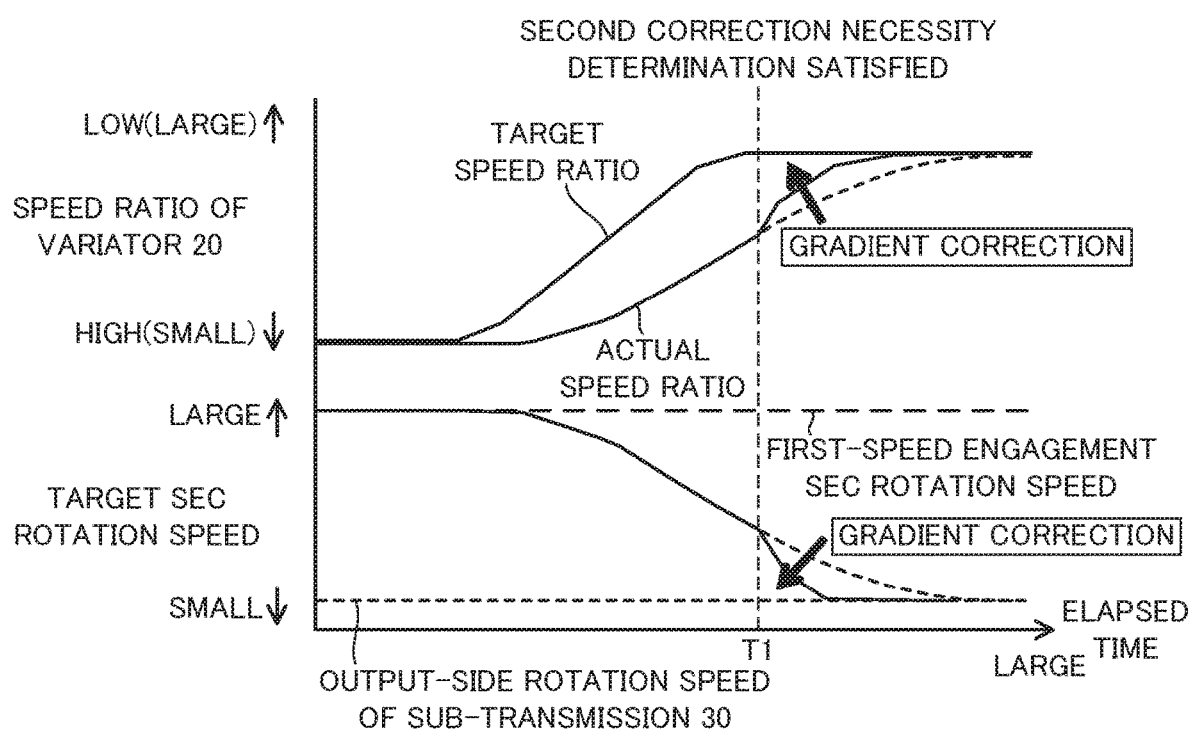
FIG. 5 is a chart showing a variator shift speed correction.

Thus, the controller 12 corrects the shift speed of the variator 20 at timing T1. This correction is a correction to increase the shift speed of the variator 20 higher than the shift speed at timing T1 at which the deviation between the through speed ratio and the target through speed ratio is detected or predicted. In other words, this correction is a correction to make the magnitude of a gradient of the actual speed ratio of the variator 20 larger than that of the gradient at timing T1 as shown in FIG. 5.

Such a correction can be specifically performed, for example, by changing a feedback correction amount to increase the shift speed of the variator 20 in a feedback control of controlling the actual speed ratio of the variator 20 to the target speed ratio.

The target sub-speed ratio is calculated on the basis of the actual speed ratio of the variator 20 in Step S2 described above. Thus, by performing the correction to increase the shift speed of the variator 20, a correction to increase the shift speed of the target sub-speed ratio is also performed via this correction. In other words, as shown in FIG. 5, a correction is also performed to make the magnitude of the gradient of the target SEC rotation speed larger than that of the gradient at timing T1. Since the shift speed of the sub-transmission mechanism 30 can be prevented from being fixed at the lower limit value in this way, it is possible to prevent the coordinated shift from being lost.

Next, main functions and effects of the transmission 100 are described. The transmission 100 includes the sub-transmission mechanism 30 serving as a first transmission mechanism, the variator 20 serving as a second transmission mechanism having lower shift responsiveness than the first transmission mechanism, and the controller 12 serving as a shift control unit configured to carry out a coordinated shift such that the through speed ratio reaches the target through speed ratio. The controller 12 serving as the shift control unit sets the target sub-speed ratio on the basis of the target through speed ratio and the actual speed ratio of the variator 20 in carrying out the coordinated shift.

According to the transmission 100 thus configured, since the target speed ratio of the sub-transmission mechanism 30 having higher shift responsiveness than the variator 20, i.e. the target sub-speed ratio, is set on the basis of the target through speed ratio and the actual speed ratio of the variator 20, the target through speed ratio and the actual through speed ratio can be prevented from deviating. Thus, even if the sub-transmission mechanism 30 serving as the first transmission mechanism and the variator serving as the second transmission mechanism differ in shift responsiveness, a loss of the coordinated shift can be suppressed. As a result, a sense of incongruity given to a driver can be eliminated.

When the variator 20 is upshifted or downshifted according to the accelerator pedal operation, the actual speed ratio follows the target speed ratio with a delay in the variator 20. Thus, the actual speed ratio and the target speed ratio do not match.

If the target sub-speed ratio is set on the basis of the target through speed ratio and the actual speed ratio of the variator 20 before the shift of the sub-transmission mechanism 30 is started and the inertia phase is started in this state, it is instructed to suddenly change the target sub-speed ratio before the start of the inertia phase. As a result, the friction engaging elements of the sub-transmission mechanism 30 are unnecessarily set in a slip state or a torque of the engine 1 varies.

In view of such a situation, in the transmission 100, the controller 12 serving as the shift control unit sets the target sub-speed ratio on the basis of the target through speed ratio and the actual speed ratio of the variator 20 during the inertia phase in the sub-transmission mechanism 30 in carrying out the coordinated shift. In the transmission 100, the sub-transmission mechanism 30 serving as the first transmission mechanism is a stepped transmission mechanism for changing the speed ratio by re-engaging the friction engaging elements, and the variator 20 serving as the second transmission mechanism is a continuously variable transmission mechanism including the PRI pulley 21, the SEC pulley 22 and the belt 23 wound on the PRI pulley 21 and the SEC pulley 22.

According to the transmission 100 thus configured, it is possible to prevent the deterioration of drivability caused by unnecessarily setting the friction engaging elements of the sub-transmission mechanism 30 in the slip state before the start of the inertia phase or due to a variation of the torque of the engine 1.

In the transmission 100, the controller 12 serving as the shift control unit further performs a correction to transition from the speed ratio obtained in the gear position engaged in the sub-transmission mechanism 30 before the start of the inertia phase to the initial target sub-speed ratio, i.e. the target sub-speed ratio set by the controller 12 serving as the shift control unit by changing the target sub-speed ratio by the predetermined change amount after the shift of the sub-transmission mechanism 30 is started when the target speed ratio and the actual speed ratio differ in the variator 20 at the start of the inertia phase.

According to the transmission 100 thus configured, a situation can be prevented in which it is instructed to suddenly change the target sub-speed ratio at the start of the inertia phase and, as a result, drivability is deteriorated. Further, since the target sub-speed ratio can be gradually changed, a situation can be prevented in which the coordinated shift is lost and a sense of incongruity is given to the driver due to a sudden change of the target sub-speed ratio.

In the transmission 100, the sub-transmission mechanism 30 serving as the first transmission mechanism is a stepped transmission mechanism for changing the speed ratio by re-engaging the friction engaging elements, and the variator 20 serving as the second transmission mechanism is a continuously variable transmission mechanism including the PRI pulley 21, the SEC pulley 22 and the belt 23 wound on the PRI pulley 21 and the SEC pulley 22. Further, in the transmission 100, the controller 12 serving as the shift control unit further sets the lower limit value for the shift speed of the sub-transmission mechanism 30 in carrying out the coordinated shift.

According to the transmission 100 thus configured, a reduction of the shift speed of the sub-transmission mechanism 30 and the occurrence of judder in the friction engaging elements of the sub-transmission mechanism 30 can be prevented or suppressed in carrying out the coordinated shift.

In the transmission 100, the lower limit value is set as a minimum value of the shift speed at which judder does not occur in shifting the sub-transmission mechanism 30.

According to the transmission 100 thus configured, the occurrence of judder in the sub-transmission mechanism 30 can be prevented in carrying out the coordinated shift. Further, since the lower limit value is set as low as possible, it can be made more difficult for the shift speed of the sub-transmission mechanism 30 to reach the lower limit value. Thus, the shift speed of the sub-transmission mechanism 30 cannot further decrease after reaching the lower limit value, with the result that it is also possible to suppress the occurrence of a situation in which the target through speed ratio and the through speed ratio deviate.

In the transmission 100, the controller 12 serving as the shift control unit increases the shift speed of the variator 20 higher than the shift speed at the time of detecting or predicting the deviation between the target through speed ratio and the through speed ratio if the deviation between the target through speed ratio and the through speed ratio is detected or predicted. The deviation between the target through speed ratio and the through speed ratio is detected or predicted when the shift speed of the sub-transmission mechanism 30 reaches the lower limit value.

According to the transmission 100 thus configured, since the shift speed of the sub-transmission mechanism 30 can be prevented from being fixed at the lower limit value as described above using FIG. 5, a loss of the coordinated shift can be prevented.

In the transmission 100, the controller 12 serving as the shift control unit may be configured, when judder occurs in shifting the sub-transmission mechanism 30 at a shift speed higher than the lower limit value, to set the lower limit value to a shift speed higher than the shift speed at which this judder occurs. A known technique or another appropriate technique may be applied to determine the occurrence of judder.

In this way, if judder occurs at the shift speed higher than the initially set lower limit value in the sub-transmission mechanism 30 due to a variation or aging caused by individual differences of the transmission 100, the lower limit value can be updated. Specifically, the lower limit value can be a variable value which is updated by so-called learning without being a fixed value.

Thus, according to the transmission 100 thus configured, it is possible to prevent the occurrence of judder while preventing the shift speed of the sub-transmission mechanism 30 from easily reaching the lower limit value to lose the coordinated shift as a result of setting the lower limit value higher than necessary.

Although the embodiment of the present invention has been described above, the above embodiment is merely an illustration of one application example of the present invention and not intended to limit the technical scope of the present invention to the specific configuration of the above embodiment.

Although the sub-transmission mechanism 30 has been described to have two forward gear positions in the above embodiment, the sub-transmission mechanism 30 may, for example, have three or more forward gear positions.

Although the controller 12 is configured as the shift control unit in the above embodiment, the shift control unit may be, for example, composed of a plurality of controllers.

The predetermined change amount only has to be set so that the target sub-speed ratio does not suddenly change. Thus, it is, for example, also possible to set the predetermined change amount at a fixed value.

Although the drive source is the engine 1 in the above embodiment, the drive source may be, for example, a motor or a combination of an engine and a motor.

The present application claims a priority based on Japanese Patent Application No. 2015-125534 filed with the Japan Patent Office on Jun. 23, 2015, all the contents of which are hereby incorporated by reference.

The invention claimed is:

1. A transmission, comprising:
    a stepped transmission mechanism provided in a power transmission path for transmitting power from a drive source of a vehicle to drive wheels, the stepped transmission mechanism changing a speed ratio by re-engaging friction engaging elements;
    a continuously variable transmission mechanism including two pulleys and a belt wound on the two pulleys, the continuously variable transmission mechanism being provided in series with the stepped transmission mechanism in the power transmission path, the continuously variable transmission mechanism having lower shift responsiveness than the stepped transmission mechanism; and
    a controller configured to carry out a coordinated shift for changing a speed ratio of the continuously variable transmission mechanism in a direction opposite to a changing direction of the speed ratio of the stepped transmission mechanism as the stepped transmission mechanism is shifted so that a through speed ratio, the through speed ratio being an overall speed ratio of the stepped transmission mechanism and the continuously variable transmission mechanism, reaches a target through speed ratio;
    the controller configured to set a target speed ratio of the stepped transmission mechanism on the basis of the target through speed ratio and an actual speed ratio of the continuously variable transmission mechanism during an inertia phase in the stepped transmission mechanism in carrying out the coordinated shift, and the controller further configured to perform a correction to cause a transition from a speed ratio, before a start of the inertia phase, to the target speed ratio set, by the controller, during the inertia phase by gradually changing the target speed ratio of the stepped transmission mechanism by a predetermined change amount so as to prevent the target speed ratio of the stepped transmission mechanism from suddenly changing when a target speed ratio and the actual speed ratio differ in the continuously variable transmission mechanism at the start of the inertia phase.

2. The transmission according to claim 1, wherein:
the controller is further configured to set a lower limit value for a shift speed of the stepped transmission mechanism in carrying out the coordinated shift.

3. The transmission according to claim 2, wherein:
the lower limit value is set as a minimum value of the shift speed, at which judder does not occur, in shifting the stepped transmission mechanism.

4. The transmission according to claim 3, wherein:
the controller is configured to set a shift speed of the continuously variable transmission mechanism higher than a shift speed at a time of detecting or predicting a deviation between the target through speed ratio and the through speed ratio when the deviation between the target through speed ratio and the through speed ratio is detected or predicted.

5. The transmission according to claim 2, wherein:
the controller is configured to set the lower limit value to a shift speed higher than a shift speed, at which judder occurs, if the judder occurs in shifting the stepped transmission mechanism at a shift speed higher than the lower limit value.

6. A control method for a transmission with a stepped transmission mechanism provided in a power transmission path for transmitting power from a drive source of a vehicle to drive wheels, the stepped transmission mechanism changing a speed ratio by re-engaging friction engaging elements, and a continuously variable transmission mechanism including two pulleys and a belt wound on the two pulleys, the continuously variable transmission mechanism being provided in series with the stepped transmission mechanism in the power transmission path, the continuously variable transmission mechanism having lower shift responsiveness than the stepped transmission mechanism, comprising:

carrying out a coordinated shift for changing a speed ratio of the continuously variable transmission mechanism in a direction opposite to a changing direction of the speed ratio of the stepped transmission mechanism as the stepped transmission mechanism is shifted so that a through speed ratio, the through speed ratio being an overall speed ratio of the stepped transmission mechanism and the continuously variable transmission mechanism, reaches a target through speed ratio;

setting a target speed ratio of the stepped transmission mechanism on the basis of the target through speed ratio and an actual speed ratio of the continuously variable transmission mechanism during an inertia phase in the stepped transmission mechanism in carrying out the coordinated shift; and performing a correction to transition from a speed ratio before a start of the inertia phase to the target speed ratio set during the inertia phase by gradually changing the target speed ratio of the stepped transmission mechanism by a predetermined change amount so as to prevent the target speed ratio of the stepped transmission mechanism from suddenly changing when a target speed ratio and the actual speed ratio differ in the continuously variable transmission mechanism at the start of the inertia phase.

* * * * *